(12) United States Patent
Balkan et al.

(10) Patent No.: US 8,793,411 B1
(45) Date of Patent: Jul. 29, 2014

(54) BRIDGE CIRCUIT REORDER BUFFER FOR TRANSACTION MODIFICATION AND TRANSLATION

(71) Applicant: Apple Inc., Cupertino, CA (US)

(72) Inventors: Deniz Balkan, Santa Clara, CA (US); Gurjeet S Saund, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/785,983

(22) Filed: Mar. 5, 2013

(51) Int. Cl.
*G06F 13/28* (2006.01)
(52) U.S. Cl.
USPC .................. 710/52; 710/53; 710/54; 710/72; 710/73; 710/74
(58) Field of Classification Search
USPC ......................................... 710/52–54, 72–74
See application file for complete search history.

(56) References Cited

U.S. PATENT DOCUMENTS

| 7,454,530 | B2 * | 11/2008 | Cahill et al. ...................... 710/8 |
| 7,953,941 | B2 * | 5/2011 | Horishima et al. ........... 711/154 |
| 7,975,092 | B2 | 7/2011 | Xiong |
| 8,301,822 | B2 | 10/2012 | Pinto et al. |
| 2010/0312934 | A1 | 12/2010 | Chi et al. |
| 2011/0055439 | A1 | 3/2011 | Chen et al. |
| 2013/0042038 | A1 | 2/2013 | Byrne et al. |

* cited by examiner

*Primary Examiner* — Tammara Peyton
(74) *Attorney, Agent, or Firm* — Meyertons, Hood, Kivlin, Kowert & Goetzel, P.C.

(57) ABSTRACT

Embodiments of a bridge circuit and system are disclosed that may allow for converting transactions from one communication protocol to another. The bridge circuit may be coupled to a first bus employing a first communication protocol, and a second bus employing a second communication protocol. The bridge circuit may be configured to receive transactions over the first bus and store parameters associated with the received transactions. The bridge circuit may be further configured to modify the received transaction, convert the modified transaction to the second communication protocol, and transmit the converted transaction over the second bus.

17 Claims, 13 Drawing Sheets

BRIDGE CIRCUIT REORDER BUFFER FOR TRANSACTION MODIFICATION AND TRANSLATION

BACKGROUND

1. Technical Field

This invention is related to the field of integrated circuit implementation, and more particularly to the implementation of communication protocol conversion circuits.

2. Description of the Related Art

Computing systems may include one or more systems on a chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Each functional block included within an SoC may be designed in accordance to one of various design flows. The logical operation of some functional blocks may be described in a high-level computer language such as, e.g., Very-high-speed integrated circuit hardware description language (VHDL). Logic gate implementations of blocks described in such a fashion may be generated using logic synthesis and place-and-route design techniques. Other functional blocks, such as memories, phase-locked loops (PLLs), analog-to-digital converters (ADCs), may be designed in a full-custom fashion.

Functional blocks within an SoC may be connected to one another through a bus. Such busses may employ proprietary communications protocols or they may employ industry-standard communication protocols, such as, Peripheral Component Interconnect Express (PCIe®), for example. Some SoC implementations may allow for multiple communication protocols to be employed between the various functional blocks included within the SoC.

SUMMARY OF THE EMBODIMENTS

Various embodiments of a bridge circuit are disclosed. Broadly speaking, a circuit and a method are contemplated in which an interface unit is coupled to a first bus employing a first communication protocol, and a master unit is coupled to the interface unit and a second bus employing a second communication protocol. The interface unit may include a transmission unit configured to encode and transmit transactions on the first bus, and a receive unit configured to receive and decode transactions from the first bus. The master unit may be configured to receive a request encoded with the second communication protocol from the second bus, modify the received request, convert the modified request to the first communication protocol, and send the converted request to the interface unit.

In another embodiment, the master unit may be further configured to compact the received request. The compaction may be dependent upon a determination that the burst size of the request is less than width of the second bus.

In a further embodiment, the master unit may include a buffer memory. The buffer memory may, in another embodiment, store data indicative of the burst size of the received request in the buffer memory.

BRIEF DESCRIPTION OF THE DRAWINGS

The following detailed description makes reference to the accompanying drawings, which are now briefly described.

Figure 1:
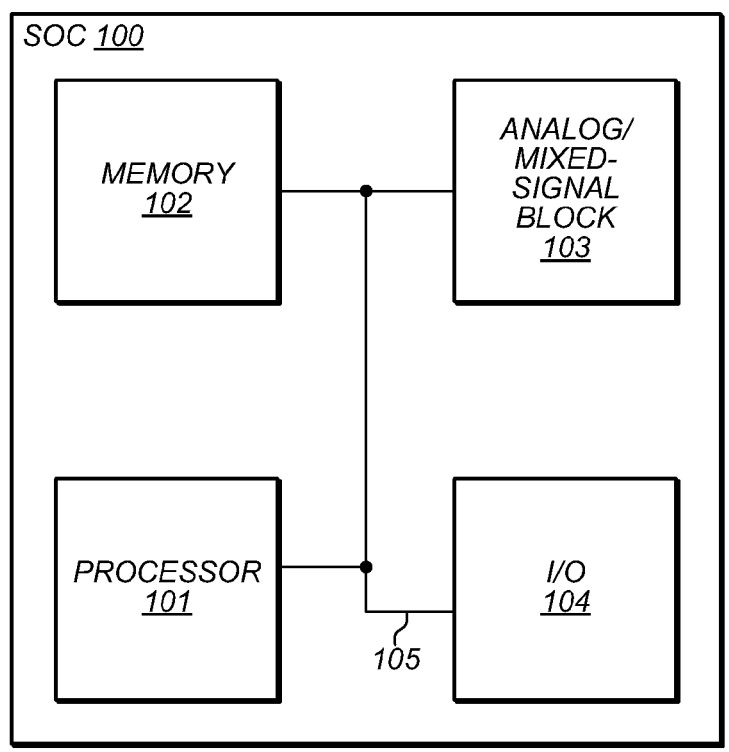
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Some functional blocks may be designed using a full-custom design methodology, while other functional blocks may be implemented using logic synthesis and place-and-route. In some embodiments, some functional blocks may be re-used from a previous SoC design, while other may be designed for a specific task for a given SoC. Other functional blocks may be purchased from third party vendors for inclusion in an SoC design.

To implement an SoC, the various included functional blocks may be designed to communicate with one another. In some embodiments, the communication may be a point-to-point bus, which may allow two or more functional blocks to communicate with each other. Some embodiments, however, may include functional blocks whose functionality is shared by amongst the other functional blocks included on the SoC. To accommodate the sharing of functional blocks, a common communication bus may be employed.

In some embodiments, a common communication bus may employ one of various communication protocols to arbitrate requests and responses from various functional blocks coupled to the communication bus. In some embodiments, the communication protocols may be proprietary in nature while, in other embodiments, the communication protocols may conform to one of various industry standard communication protocols.

In various embodiments, different functional blocks may employ different communication protocols. Some embodiments may employ bridge circuits to translate transactions from one communication protocol to another. Improved communication between functional blocks may be accomplished ensuring data corresponding to transactions is contiguous after communication protocol conversion. Specialized circuits may be employed to detect transactions, which may require special processing or that exceed pre-determined sizes. The embodiments illustrated in the drawings and described below may provide techniques for implementing improved communication and special transaction processing between functional blocks within an SoC.

System-on-a-Chip Overview

A block diagram of an SoC is illustrated in FIG. 1. In the illustrated embodiment, the SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include one or more register files and memories.

In some embodiments, processor 101 may implement any suitable instruction set architecture (ISA), such as, e.g., the ARM™, PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, or a Ferroelectric Random Access Memory (FeRAM), for example. In some embodiments, memory block 102 may be configured to store program code or program instructions that may be executed by processor 101. Memory block 102 may, in other embodiments, be configured to store data to be processed, such as graphics data, for example.

It is noted that in the embodiment of an SoC illustrated in FIG. 1, a single memory block is depicted. In other embodiments, any suitable number of memory blocks and memory types may be employed.

Analog/mixed-signal block 103 may include a variety of circuits including, for example, a crystal oscillator, a phase-locked loop (PLL) or delay-locked loop (DLL), an analog-to-digital converter (ADC), and a digital-to-analog converter (DAC) (all not shown). In other embodiments, analog/mixed-signal block 103 may be configured to perform power management tasks with the inclusion of on-chip power supplies, voltage regulators, and clock frequency scaling circuitry. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol or IEEE 1394 (Firewire®) protocol, and may allow for program code and/or program instructions to be transferred from a peripheral storage device for execution by processor 101.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Intra-Block Communication Protocols

Figure 2:
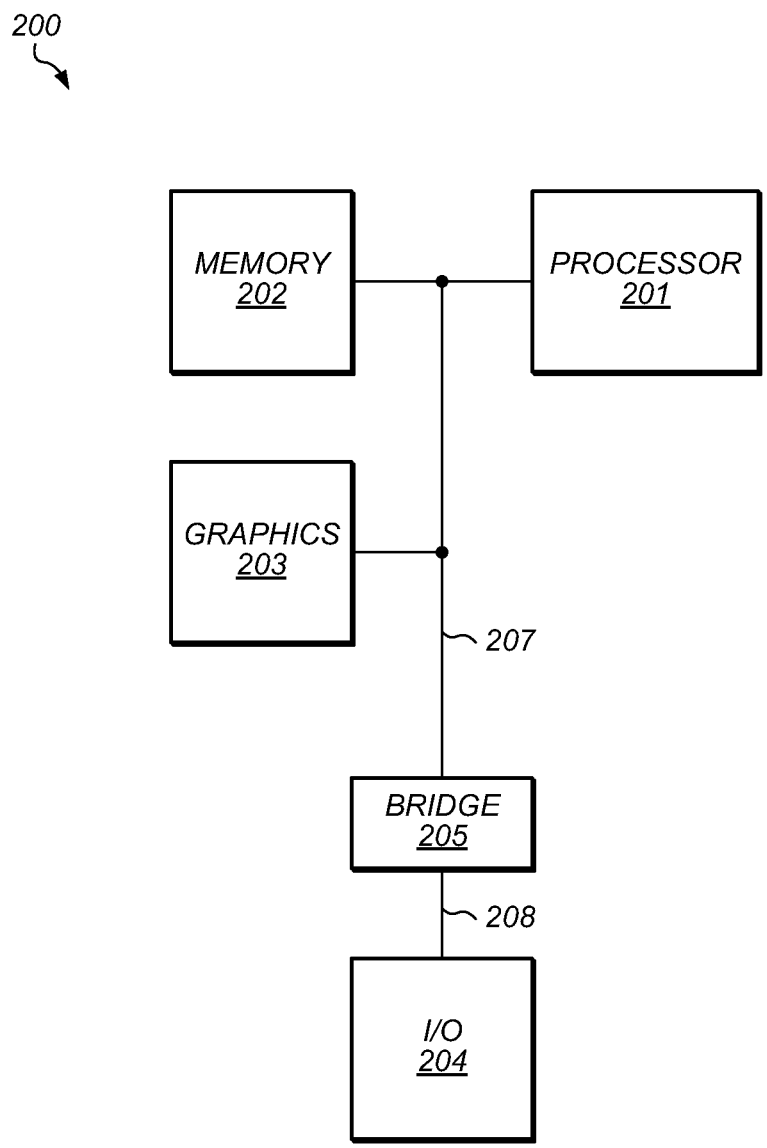
FIG. 2 illustrates another embodiment of a system-on-a-chip.

Turning to FIG. 2, another embodiment of an SoC is illustrated. In the illustrated embodiment, SoC 200 includes processor 201 coupled to memory 202, graphics controller 203, and bridge circuit 205 through bus 207. Bridge circuit 205 is further coupled to I/O block 204 through bus 208. Although only one bridge circuit is illustrated in SoC 200, in other embodiments, multiple bridge circuits with corresponding error circuits and functional blocks may be employed.

Functional blocks of an SoC may communicate with other functional blocks by sending commands and data (collectively referred to as "transactions") over a bus, such as bus 207. Such transactions may include, without limitation, read and write memory requests, and read and write peripheral input/output (PIO). A functional block may be configured as a master device or a slave device on the bus. A master device may be configured to initiate a transaction on the bus, while a slave device may be configured to only respond to requests. In some embodiments, there may be more than one device configured as a master connected to a bus.

Transactions on a bus, such as, e.g., bus 207 and bus 208, may be encoded by one of various communication protocols. For example, transactions may be encoded using an industry standard communication protocol, or a proprietary communication protocol. In some embodiments, different busses within an SoC may employ different communication protocols. For example, in SoC 200, bus 208 may encode transactions using one such communication protocol, while bus 207 may employ another communication protocol. Although SoC 200 shows two busses, it is noted that in other embodiments, additional busses with various communication protocols may be employed.

When multiple busses with different communication protocols are employed in an SoC, it may be necessary to convert transactions encoded with one communication protocol to another communication protocol. For example, in order for processor 201 to issue a PIO read or write request to I/O block 204, the request must be converted from the communication protocol employed on bus 207 to the communication protocol employed on bus 208. A bridge circuit, such as, e.g. bridge circuit 205, may, in some embodiments, be employed to perform the communication protocol conversion.

Dependent upon the communication protocols employed, certain transactions may require modification before conversion from one communication protocol to another communication protocol. In some embodiments, when a transaction is initiated by a functional block to another functional block residing on a different bus, the transaction may pass through a bridge circuit for conversion into the proper communication protocol for the recipient. The bridge circuit may then determine that the transaction requires modification, such as, e.g., data compaction, before conversion to the desired communication protocol. Once the modification has been performed, the bridge may convert the transaction to the desired communication protocol, and transmit the converted transaction to the intended recipient.

It is noted that the SoC illustrated in FIG. 2 is merely an example. In other embodiments, different numbers of functional blocks, and different numbers of interface types are possible and contemplated.

Bridge Circuit Operation

Figure 3:
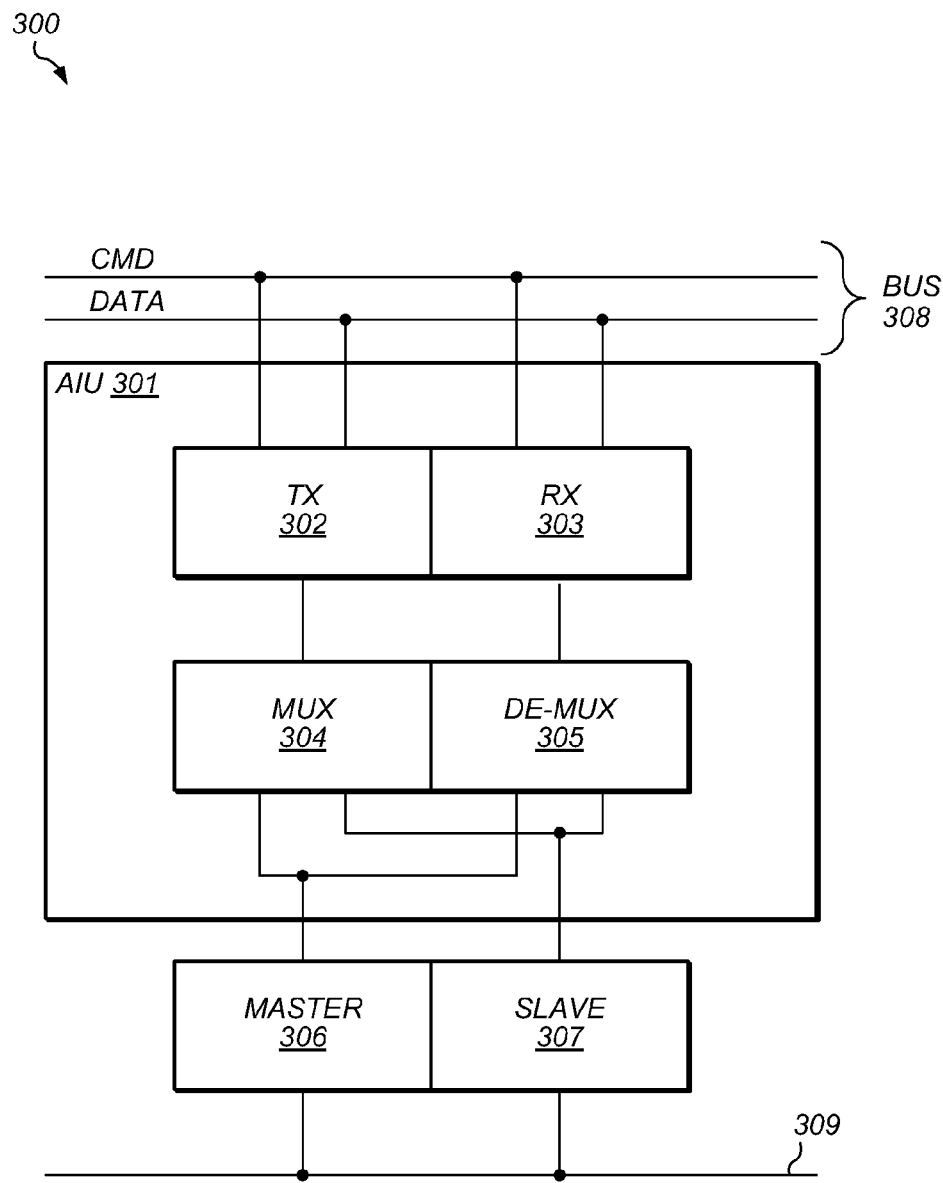
FIG. 3 illustrates an embodiment of a bridge circuit.

Turning to FIG. 3, an embodiment of a bridge circuit is illustrated. In the illustrated embodiment, bridge circuit 300 includes master unit 306 and slave unit 307 coupled to agent interface unit 301, which is, in turn, coupled to bus 308. Master unit 306 and slave unit 307 are further coupled to bus 309. In some embodiments, bus 308 and bus 309 may employ different communication protocols. For example, bus 309 may have no ordering restrictions between read and write transactions, while bus 308 may allow both read and write commands to exist on a single command bus in a time-domain multiplexed fashion. Although bus 309 is depicted as a single line in the embodiment illustrated in FIG. 3, bus 309 may employ multiple signal lines in other embodiments.

Agent interface unit 301 may include transmit unit 302 and receive unit 303. Transmit unit 302 may configured to encode and transmit transactions with the communication protocol employed by bus 308. Receive unit 303 may be configured to receive transactions from bus 308 and decode them. In some embodiments, transmit unit 302 and receive unit 303 may be coupled to bus 308 through separate command and data signal lines.

In various embodiments, agent interface unit 301 may include multiplex circuit 304 and de-multiplex circuit 304. In embodiments where bus 308 allow read and write commands to exist in a time-domain multiplexed fashion, multiplex circuit 304 may be configured to encode commands from commands received from master unit 306 and slave unit 307. De-multiplex circuit 305 may be configured to decode the time-domain multiplexed commands on bus 308 in preparation for use by master unit 306 and slave unit 307. In some embodiments, agent interface unit 301 may also include arbitration circuits that may be configured to assist in sending and receiving commands and data via bus 308.

Master unit 306 may be configured for converting requests on bus 309 intended for a functional block coupled to bus 308, and then converting any response from the target functional block on bus 308 back to communication protocol of bus 309 and sending the response back to initiating entity on the bus 309. In some embodiments, the conversion process may employ multiplex circuit 304 and de-multiplex circuit 305.

In cases where a request is made by a functional block on bus 308 to a functional block on bus 309, slave unit 307 may be configured to convert the request from the communication protocol of bus 308 to the communication protocol of bus 309. Slave unit 307 may also be configured to convert a response on bus 309 to the communicator protocol of bus 308. In some embodiments, the conversion process may employ multiplex circuit 304 and de-multiplex circuit 305.

It is noted that the bridge circuit illustrated in FIG. 3 is merely an example. In other embodiments, different circuit blocks, and different configurations of circuit blocks are possible and contemplated.

Figure 4:
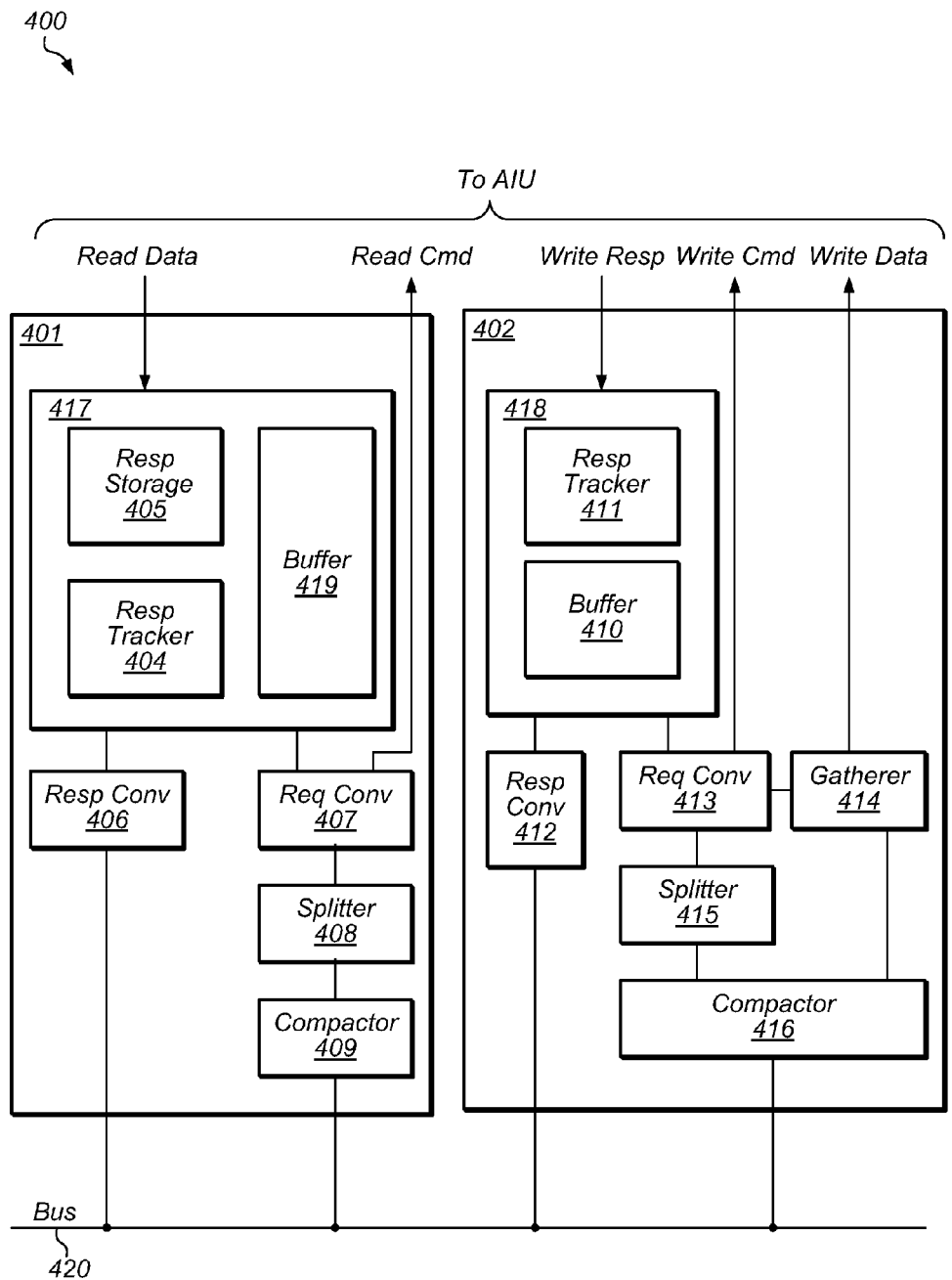
FIG. 4 illustrates an embodiment of a master unit of a bridge circuit.

An embodiment of a master unit of a bridge circuit is illustrated in FIG. 4. In the illustrated embodiment, master unit 400 includes read processing unit 401 and write processing unit 402. In some embodiments, master unit 400 may correspond to master unit 306 of bridge circuit 300 as illustrated in FIG. 3. Read processing unit 401 includes read data compactor 409, read wrap splitter 408, read request converter 407, read response converter 406, and read reorder buffer 417. Write processing unit 402 includes write data compactor 416, write wrap splitter 415, write data gatherer 414, write request converter 413, write response converter 412, and write reorder buffer 418. Read reorder buffer 417 includes response data storage 405, read response tracker 404, and read buffer 419. Write reorder buffer 418 includes write response tracker 411, and write buffer 410.

During operation, read requests on bus 420 enter read processing unit 401 through read data compactor 409. In some embodiments, read data compactor 409 may be configured to determine if the burst size of the incoming read request are less than the bus width of bus 420. Read data compactor 409 may then modify the incoming read request and information indicative of the original transaction may be stored in read reorder buffer 417. The information stored in read reorder buffer 417 may, in some embodiments, be used to re-format the response to match the format of the original request.

Once read data compactor 409 has processed an incoming read request, the read request is directed to read wrap splitter 408, where the read request is checked to see if the request is a wrapping burst (or WRAP type) request. In some embodiments, incoming requests may employ different burst styles, such as, e.g., wrapping, incrementing, non-incrementing, and the like. WRAP type requests may, in some embodiments, increment the address of a previous transfer. When the address value reaches a wrap boundary, the burst address may "wrap" to a lower address value.

Read request converter 407 may then convert the request or, in the case of a split, requests, to the desired communication protocol. In some embodiments, read request converter 407 may verify that the request does not exceed a pre-determined size. In cases where the request exceeds the pre-determined size, such as, e.g., 64-bytes, read request converter 407 may split the request into two or more smaller requests (or "spawns") each of which are less than the pre-determined size.

An entry may then be allocated in read reorder buffer 417, and information necessary from the original request may be stored in read reorder buffer 417 so that when response(s) to the request arrive, the response(s) may be transmitted to the originator in the correct order. In some embodiments, information describing the number of spawns as well as parameters of the original request may be stored in read response tracker 404.

Responses received from the recipients of transmitted requests may be stored in response storage 405. Information stored in read response tracker 404 may then be used to determine an order in which stored responses are processed. In some embodiments, information stored in read response tracker 404 may be used to convert a stored response to the communication protocol of the corresponding original request.

Write requests on bus 420 may enter write data compactor 416. For each incoming request, a burst size may be compared to the width of bus 420. When the bust size is smaller than the bus width, compaction may be performed. In some embodiments, the width of bus 420 may be configurable.

After going through write data compactor 416, a request may then be processed by write wrap splitter 415. As described above, the burst type of the request is checked and, in the case of a WRAP type request, the request is split into two requests (or "spawns"). The two spawns may then be sent to request converter 413 along with information indicating which spawn if the first spawn and second spawn of the split request. In some embodiments, write data associated with the request may be gathered by write gatherer 414. Further processing of the request may, in some embodiments, depend on all of the write data associated with the request being stored in write gatherer 414.

When responses to the various write requests are returned from the recipients of the write requests, the responses may be stored in write response tracker 411. Once all the data for a given response has been stored in write response tracker 411, information stored in write reorder buffer 418 may be used to determine an order in which responses in write response tracker 411 are converted by write response converter 412. In some embodiments, write response converter 412 may re-format the response to communication protocol of the corresponding original request, and then transmit the converted response to the originator of the corresponding original request over bus 420. In cases where a request was split (due either to being a WRAP type request or the request exceeded the pre-determined size limit), all of the resultant spawn responses are merged before the response is transmitted.

Figure 5:
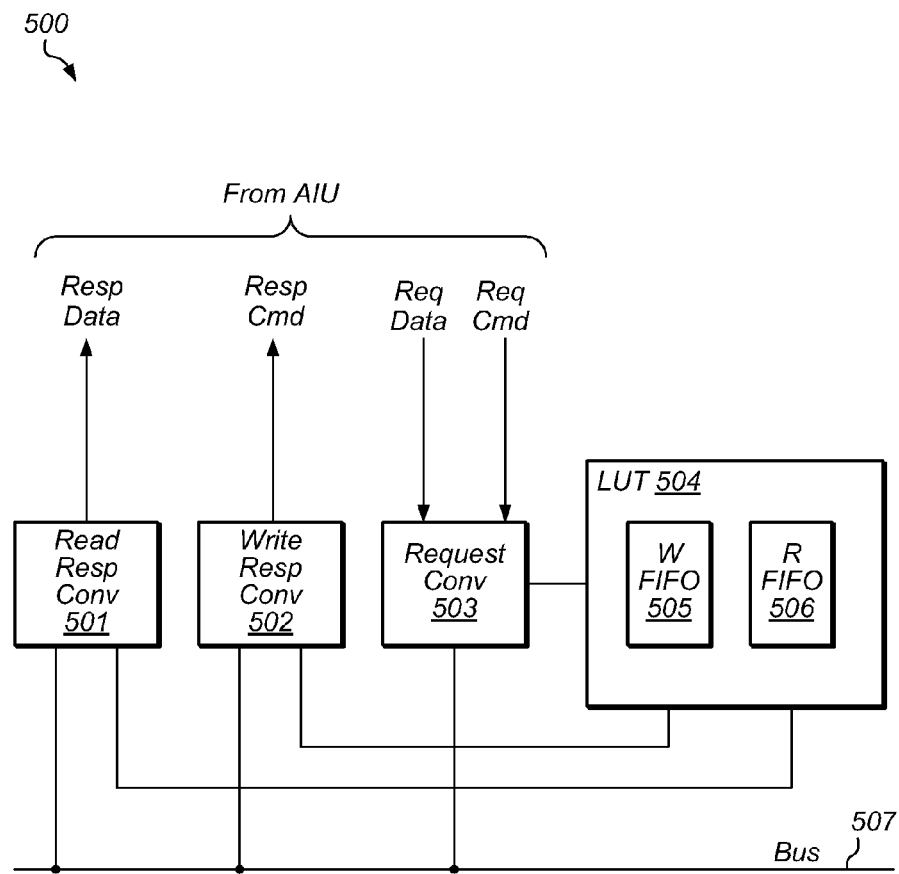
FIG. 5 illustrates an embodiment of a slave unit of a bridge circuit.

Turning to FIG. 5, an embodiment of a slave unit is illustrated. In some embodiments, slave unit 500 may correspond to slave unit 307 of bridge circuit 300 as illustrated in FIG. 3. In the illustrated embodiments, slave unit 500 includes read response converter 501, write response converter 502, request converter 503, and look-up table (LUT) 504. In some embodiments, LUT 504 may include write first in first out (FIFO) memory 505 and read FIFO memory 506.

Requests received through an AIU, such as, e.g., AIU 301 of bridge circuit 300, may be processed by request converter 503. In some embodiments, request converter 503 may be configured to translate a received request from one communication protocol to another communication protocol. Request converter 503 may, in other embodiments, store relevant fields of the received request, such as, e.g., a source ID for the received request, in LUT 504. Relevant field information for read request and write requests may, in various embodiments, be stored in read FIFO memory 505 and write FIFO memory 505, respectively.

Once a request has been translated to the communication protocol of the intended recipient, and the request has been processed by the intended recipient, responses to the request may be translated by read response converter 501 and write response converter 502. In some embodiments, write response converter 502 may be configured to read the stored fields of the original request from LUT 504, and translate the response to desired communication protocol. read response converter 501 may, in other embodiments, be configured to wait until all data associated with the response has been received through bus 507. Once all of the data has been received, read response converter 501 may then translate the response to the desired communication protocol.

It is noted that the embodiment of a slave unit illustrated in FIG. 5 is merely an example. In other embodiments, different functional blocks and different configurations of functional blocks may be employed.

Figure 6:
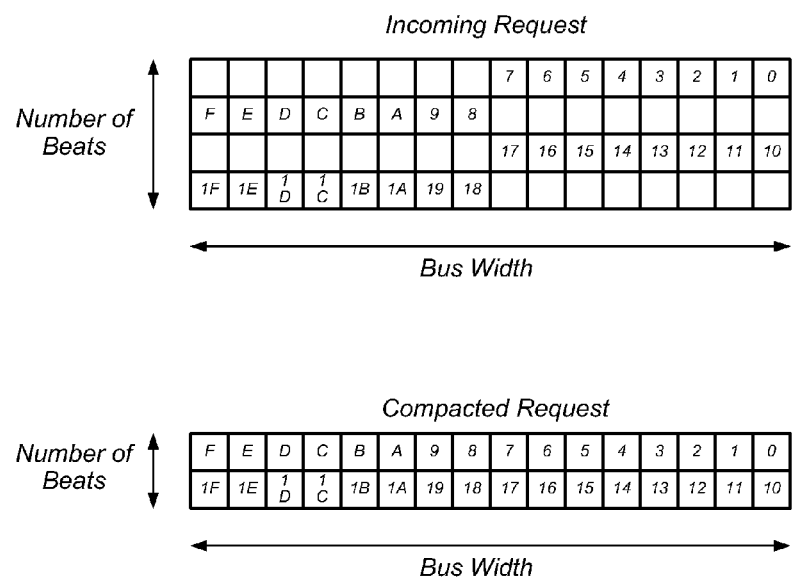
FIG. 6 illustrates an example of data compaction.

An example of data compaction of a request is illustrated in FIG. 6. In some embodiments, the depicted compaction may be the result of operating a data compaction circuit, such as, data compaction circuit 409 or 416 as illustrated in FIG. 4, for example. In the illustrated example, an incoming request from a first communication channel has a burst size of 8-bytes and a burst length of 4 beats (or "cycles"). A total of 32-bytes are transferred, but for any give beat, only half of the 16-byte wide bus is utilized.

In some embodiments, more efficient data transfer may occur by re-formatting the data to utilize the full width of the bus. In the illustrated example, following compaction, the request utilizes the full width of the bus, thereby only requiring two beats for a complete transfer of the data. It is noted that the illustrated compaction is merely an example. In other embodiments, different bus widths, different burst sizes, and different burst lengths may be employed.

Figure 7:
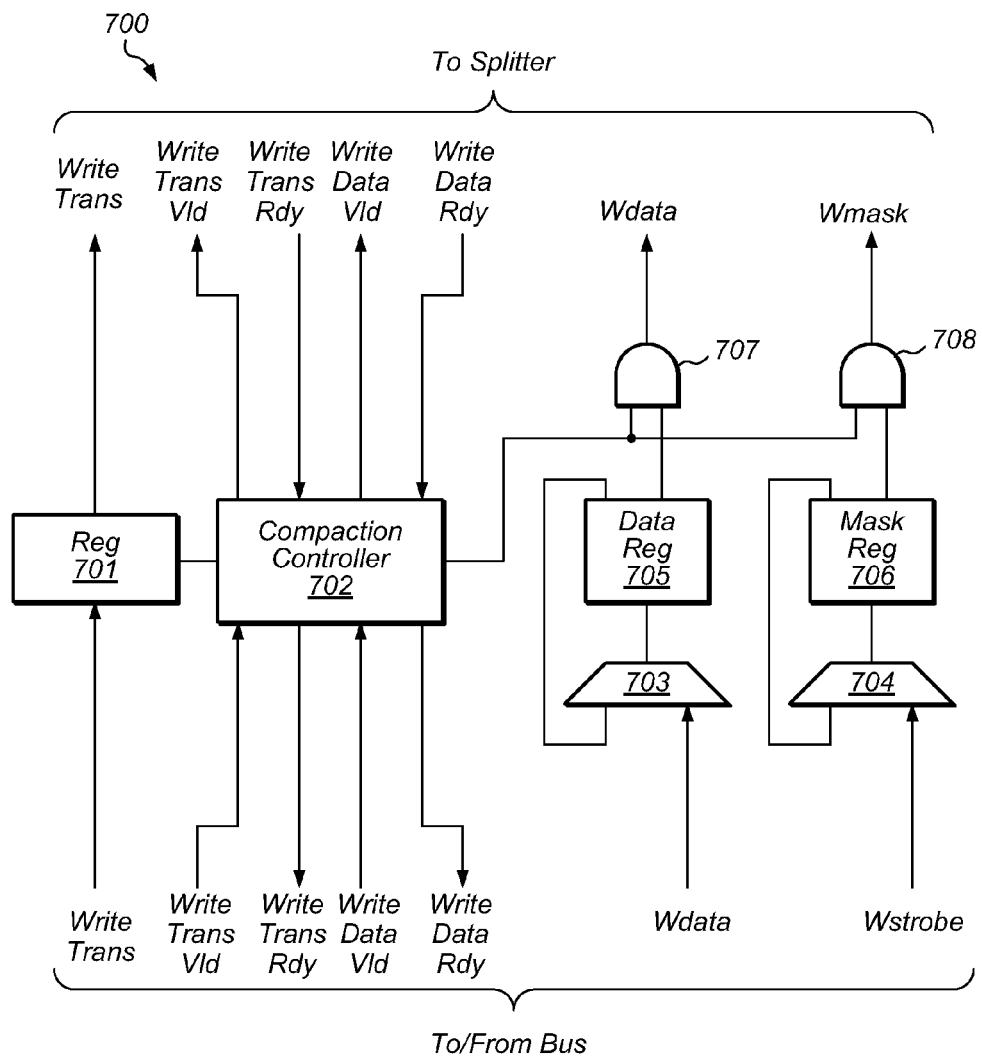
FIG. 7 illustrates an embodiment of a data compactor circuit.

Turning to FIG. 7, an embodiment of a data compaction circuit is illustrated. In some embodiments, data compaction circuit 700 may correspond to one or both of data compactor 409 and data compactor 416 of master unit 400 as illustrated in FIG. 4. In the illustrated embodiment, data compaction circuit 700 includes register 701, compaction controller 702, multiplex circuit 703, multiplex circuit 704, data register 705, mask register 706, AND gate 707, and AND gate 708.

Register 701 may be configured to store incoming requests. In some embodiments, register 701 may also be configured to send the incoming request upstream to another circuit block, such as, a splitter circuit, for example. Register 701 may be designed in accordance with various design styles. In some embodiments, register 701 may include multiple latches, flip-flops, or any other suitable storage circuits, each configured to store a data bit included in the incoming request.

Compaction controller 702 may be configured to check the burst size of the incoming request. In some embodiments, compaction controller 702 may check one or more data bits of the request that has been stored in register 701. Compaction controller 702 may also compare the burst size to width of bus. When the burst size is equal to the bus width, the compaction controller may, in some embodiments, allow the write data and mask data to proceed upstream to another circuit block, such as, e.g., a splitter circuit. In other embodiments, then the burst size is less than the bus width, write data and mask bits may be stored in registers 705 and 706, respectively. By controlling multiplex circuits 703 and 704, compaction controller 702 may then copy valid data bytes and mask bits to registers 705 and 706, and may send the contents of registers 705 and 706 to an upstream circuit. The process of storing valid data bytes and mask bits may continue until all data beats for the request have been processed.

AND gates 707 and 708 may, in some embodiments, be controlled by compaction controller 702 to control the upstream flow of data bytes and mask bits. Static AND gates, such as those shown and described herein, may be implemented according to several design styles. For example, an AND gate may be implemented as a NAND gate whose output is coupled to the input of an inverter. In other embodiments, an AND gate may be constructed from multiple NAND gates, multiple NOR gates, or any suitable combination of logic gates.

In some embodiments, multiplex circuits 703 and 704 may include one or more pass gates controlled by control compaction controller 702. The output of each pass gate may be coupled together in a wired-OR fashion. In other embodiments, multiplex circuits 703 and 704 may include one or more logic gates configured to perform the multiplexer selections function.

It is noted that a pass gate (also referred to as a "transmission gate") may include an n-channel metal-oxide-semiconductor field-effect transistor (MOSFET) and a p-channel MOSFET connected in parallel. In other embodiments, a single n-channel MOSFET or a single p-channel MOSFET may be used as a pass gate. It is further noted that, in various embodiments, a "transistor" may correspond to one or more transconductance elements such as a junction field-effect transistor (JFET), for example.

It is noted that the embodiment of data compaction circuit 700 illustrated in FIG. 7 is merely an example. In other embodiments, different circuit elements and different configurations of circuit elements may be employed.

Figure 8:
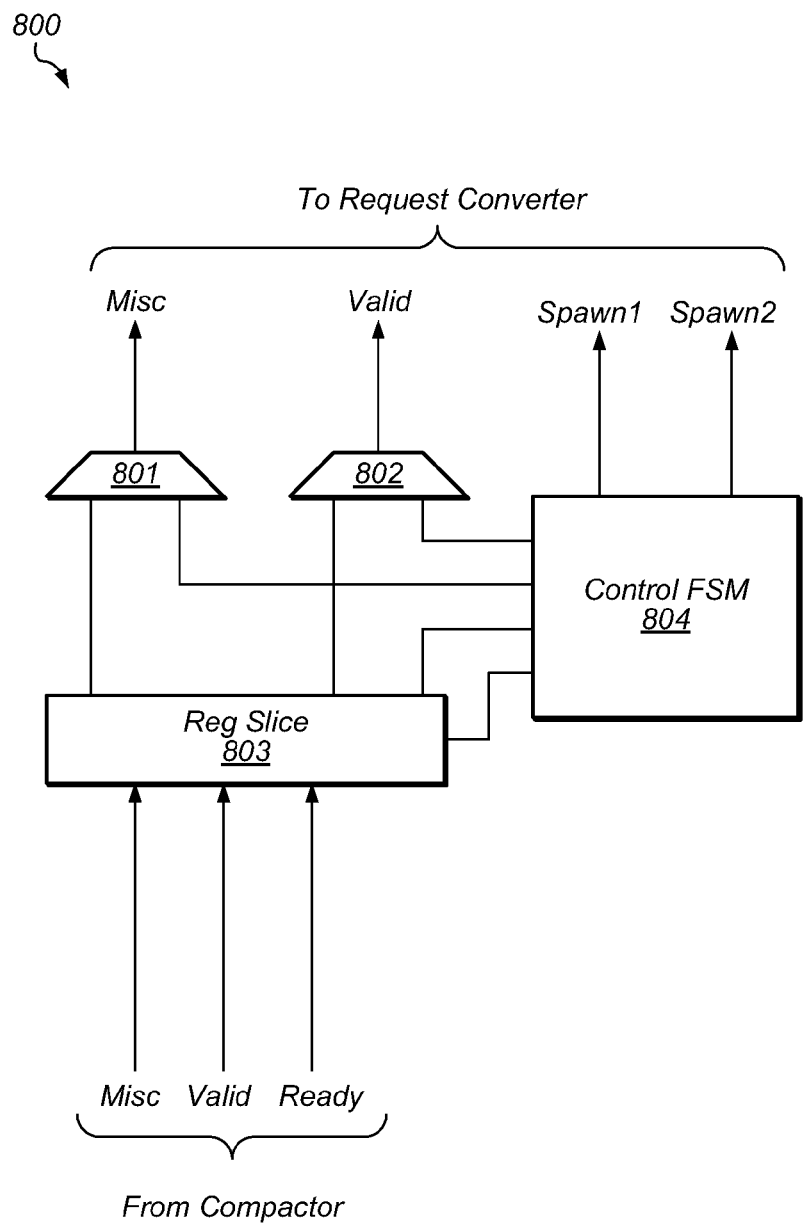
FIG. 8 illustrates an embodiment of a wrap splitter circuit.

Turning to FIG. 8, an embodiment of a wrap splitter circuit is illustrated. In some embodiments, wrap splitter circuit 800 may correspond to read wrap splitter 408 and/or write wrap splitter 415 of master unit 400 as illustrated in FIG. 4. In the illustrated embodiments, wrap splitter circuit 800 includes multiplex circuit 801, multiplex circuit 802, register slice 803, and control finite-state machine (FSM) 804.

Multiplex circuits 801 and 802 may be configured to select between values for the fields of the transactions stored in register slice 803 and values calculated by control FSM 804. In some embodiments, multiplex circuits 801 and 802 may include one or more pass gate controlled by control FSM 804. The output of each pass gate may be coupled together in a wired-OR fashion. In other embodiments, multiplex circuits 801 and 802 may include one or more logic gates configured to perform the multiplexer selections function.

Register slice 803 may be configured to store all or a portion of a request, and determine if the burst type of the request is WRAP. When a request is determined to have burst type of WRAP, register slice 803 may then determine if the request actually does wrap around. In the event that the request wraps around, register slice 803 may transmit a signal to control FSM 804. Register slice 803 may, in some embodiments, include one or more latches, flip-flops, or other suitable storage circuits. In other embodiments, register slice 803 may include one or more logic gates configured to determine the burst type of a request.

Control FSM 804 may be configured to calculate the start address and the size of two spawn requests when a request is split. The spawn requests may be sent to a request converter circuit, such as, e.g., write request converter 413 of master unit 400 as illustrated in FIG. 4, and control FSM 804 may mark each spawn request as "first of a wrap spawn" or "second of a wrap spawn." In some embodiments, marking each spawn request may include setting one or more bits of the each spawn request to a pre-determined value. Control FSM 804 may, in some embodiments, implemented using a dedicated sequential logic circuit. In other embodiments, control FSM 804 may be implemented as a general-purpose processor configured to execute program instructions that may be stored in a local memory.

It is noted that the embodiment illustrated in FIG. 8 is merely an example. In other embodiments, different functional blocks and different configurations of functional blocks are possible and contemplated.

Figure 9:
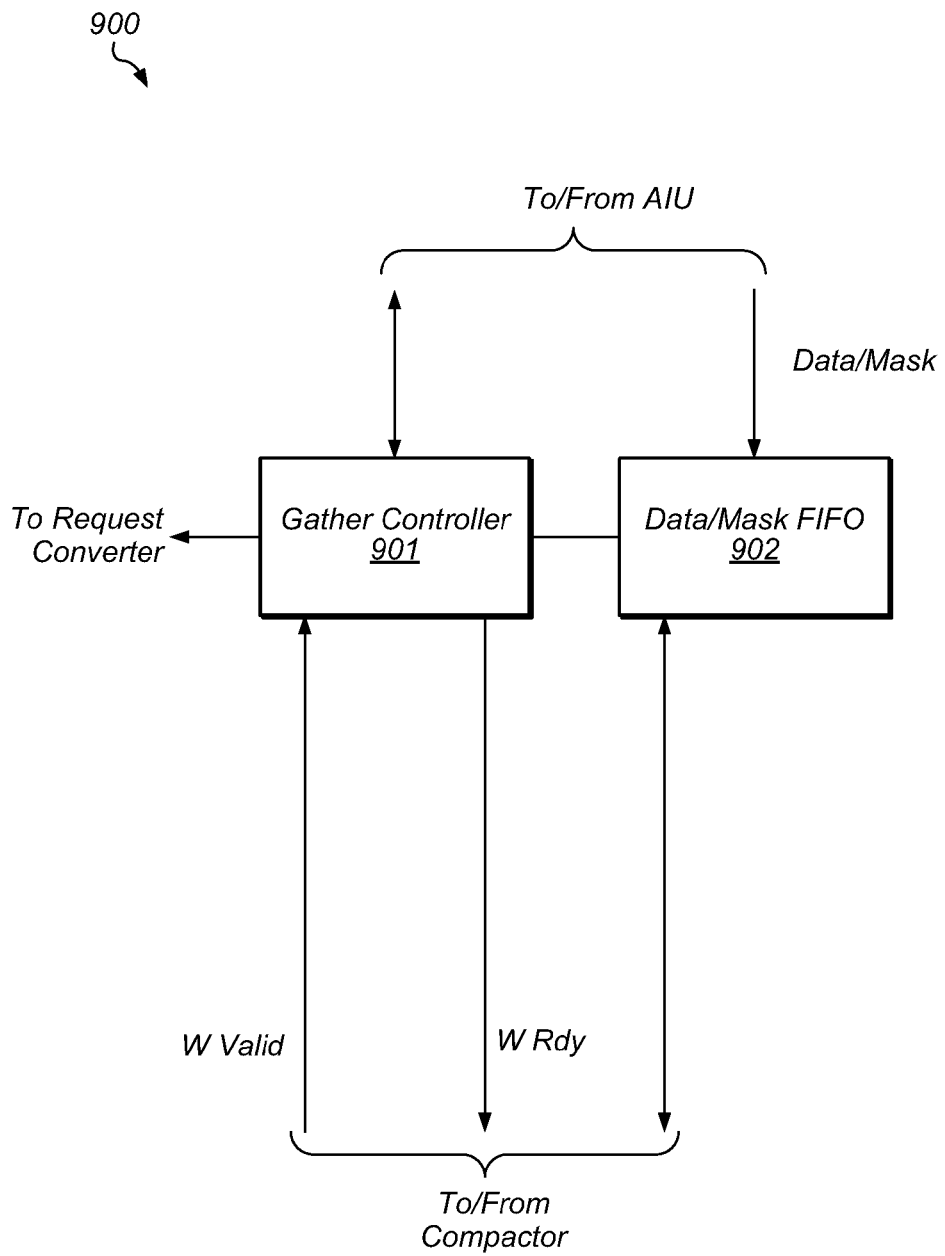
FIG. 9 illustrates an embodiment of a data gatherer circuit.

An embodiment of a data gatherer circuit is illustrated in FIG. 9. Data gatherer circuit 900 may, in some embodiments, correspond to data gatherer 414 of master unit 400 as illustrated in FIG. 4. In the illustrated embodiment, data gatherer 900 includes gatherer controller 901 and data/mask FIFO 902. In some embodiments, data gatherer 900 receives data from a data compactor circuits, such as, e.g., write data compactor 414 of master unit 400, and may be configured to operate in conjunction with a request conversion block, such as write request conversion block 413 of master unit 400 to ensure all data for a given request is in place before the request is transmitted to the request's intended recipient.

Data/mask FIFO 902 may be sized (both in width and depth) to store any suitable amount of transaction data, such as, e.g., 64-bytes. In some embodiments, data/mask FIFO 902 may include rows of one or more latches coupled together and configured to sequentially transfer data through the row of latches. A static random access memory (SRAM) may, in other embodiments, be employed to implement data/mask FIFO 902 along with circuitry configured to maintain separate read and write pointers for indexing into the SRAM.

In some embodiments, a request may be broken into multiple requests (or "spawns") by a request convertor, such as, e.g., write request convertor 413. When a request is split into multiple spawns, the request converter may indicate to gather controller 901 the size of data that needs to be sent to the request's intended recipient. Gather controller 901 may then ensure that the required amount of data is stored in data/mask FIFO 902, and indicates to the request converter when the necessary data is available. The request converter may then signal an interface unit, such as, AIU 301 of bridge circuit 300 as illustrated in FIG. 3, that the request is ready to be send to the intended recipient.

Figure 10:
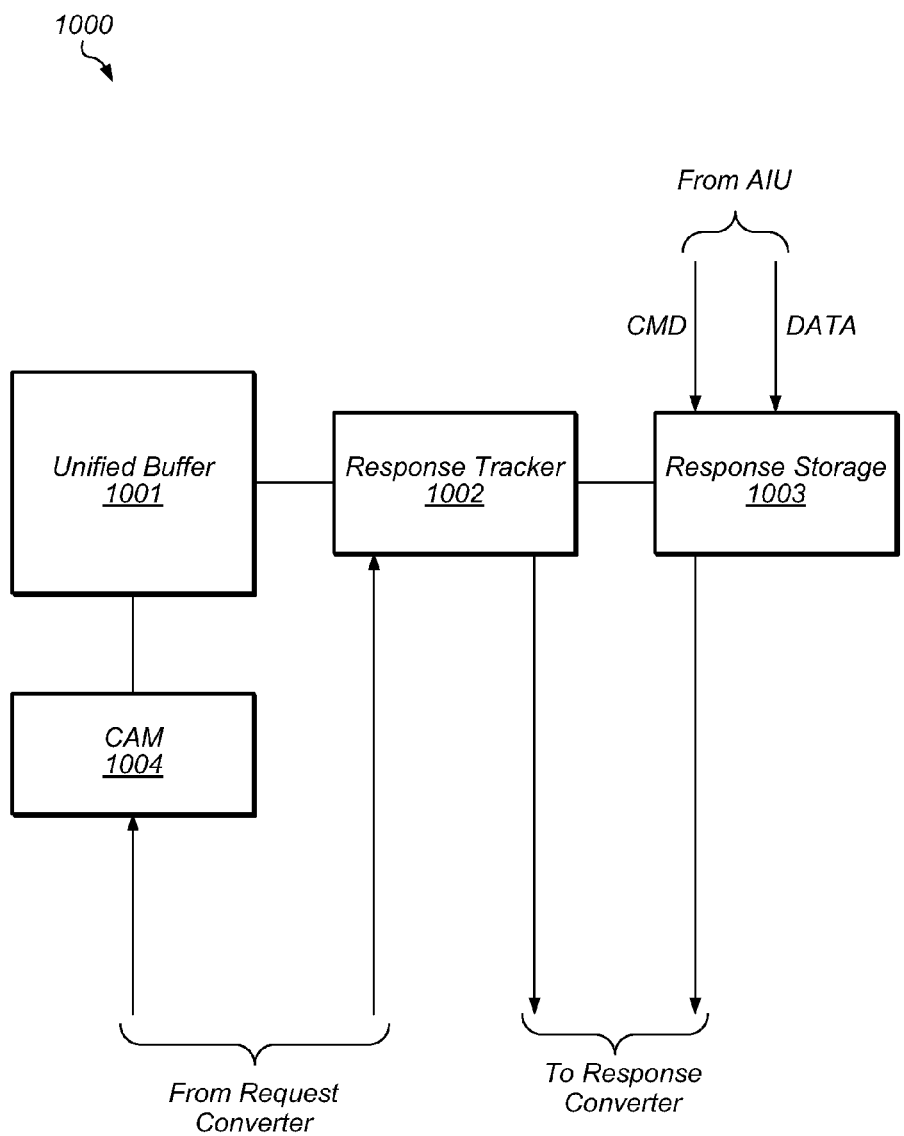
FIG. 10 illustrates an embodiment of a reorder buffer circuit.

An embodiment of a reorder buffer is illustrated in FIG. 10. In some embodiments, the embodiment illustrated in FIG. 10 may correspond to reorder buffer 417 or 418 of master unit 400 as illustrated in FIG. 4. In the illustrated embodiment, reorder buffer 1000 includes unified buffer 1001, response tracker 1002, response storage 1003, and content-addressable memory (CAM) 1004.

Reorder buffer 1000 may be used for both read and write transaction reordering. In some embodiments, reorder buffer 1000 may include a response data storage sub-block for use in read transaction processing.

During operation, reorder buffer 1000 may be responsible for obtaining an ID from a request converter, and providing a unique transaction ID (TID) to be used on a bus employing a communication protocol different from that of the original request. In some embodiments, reorder buffer 1000 may also keep track of the ordering of responses for each received request. A linked list structure may, in various embodiments, be employed to keep track of the order of transactions. In some embodiments, each element of a linked list may include a datum and a reference. The reference may be an address or pointer to a next element in the list.

Unified buffer 1001 may be used to implement the ordering functionality, i.e., the aforementioned linked list. In some embodiments, unified buffer 1001 may not be used for data storage in reorder buffer 1000. To implement the ordering functionality, unified buffer 1001 may provide a configurable number of linked list structures or "channels."

CAM 1004 may, in some embodiments, be employed to map the IDs of incoming requests to a respective channel. A new ID may be saved on the corresponding channel entry of CAM 1004. When the ID is received again, CAM 1004 may return the channel number of the linked list that tracks the ID. In some embodiments, each entry in CAM 1004 may include a counter that may be used to remove an entry from the CAM once a response to the corresponding request has been received.

Reorder buffer 1001 may also receive other relevant information for a given request. The information may include, without limitation, spawning information (e.g. spawn head, spawn count, spawn last, etc.), and parameters of the original request (e.g., burst size, burst length, etc.). Such information may be stored in response tracker 1002.

Response storage 1003 may, in some embodiments, store response data received in response to issued requests. Once all of the data associated with a given response has been received and stored in response storage 1003, the entry in response storage 1003 corresponding to the TID of the response may be marked as a valid response. In some embodiments, the entry may be checked to determine if the entry is the head of a spawn. In such cases, the number of responses may be checked to ensure that all portions of the spawn have been recovered. Once all of the data and, when necessary, all of the data for all of the spawns, have been stored, the entry may then be ready to participate in arbitration for sending a response converter, such as, e.g., response converter 406 or 412 of write unit 400 as illustrated in FIG. 4.

Unified buffer 1001, response tracker 1002 and response storage 1003 may, in some embodiments, be implemented using a SRAM, or any other suitable memory circuit. CAM 1004 may include a comparison circuit configured to compare input data words to stored data words.

It is noted that the embodiment illustrated in FIG. 10 is merely an example. In other embodiments, different storage structures, and different sizes of storage structures are possible and contemplated.

Figure 11:
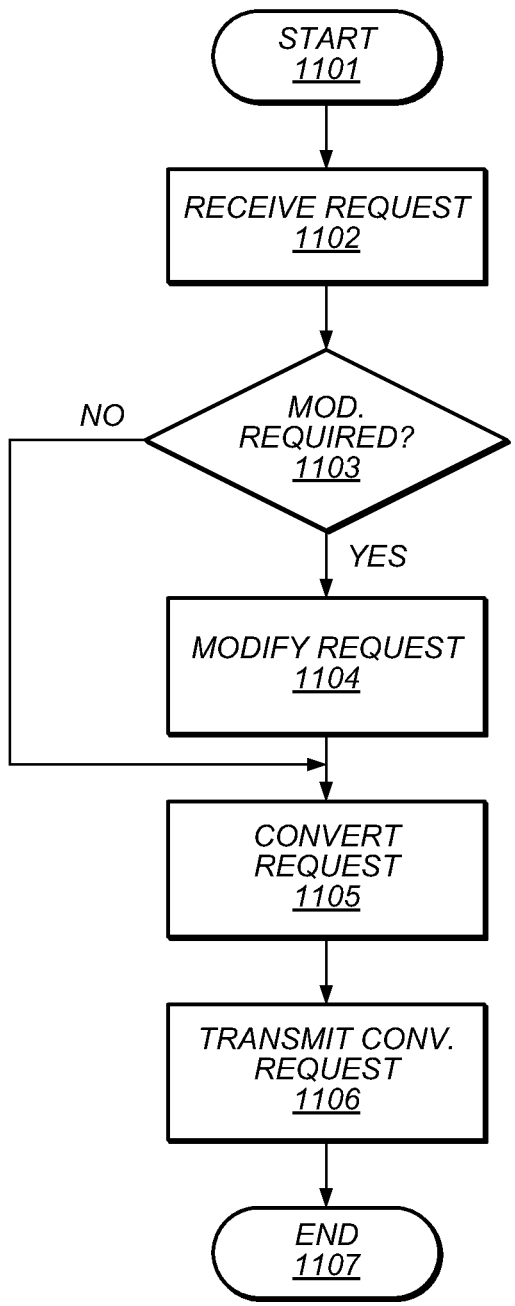
FIG. 11 illustrates a flowchart of an embodiment of a method for operating a bridge circuit.

Turning to FIG. 11, a flowchart depicting a method of operating a bridge circuit, such as, e.g., bridge circuit 300, is illustrated. The method begins in block 1101. A request may then be received (block 1102). In some embodiments, the request may be either a read request or a write request from an agent acting as a master on a first bus included on an integrated circuit, to an agent acting as a slave on a second bus included in the integrated circuit. The request may, in other embodiments, be from an agent acting as a master on the second bus included in the integrated circuit, to an agent acting as a slave on the first bus included on the integrated circuit.

The method then depends on a determination if the request requires modification (block 1103). In some embodiments, any required modification may include such operations as data compaction, wrap command splitting, creating multiple spawns for transactions exceeding a pre-determined size, or any other suitable request modification operation.

When no modification is required, the request may then be converted (block 1105). In some embodiments, the conversion may be from a communication protocol employed by the originator of the request, to a communication protocol employed by the intended recipient of the request. Once the conversion has been completed, the converted request may then be transmitted to the intended recipient (block 1106). Dependent upon the communication protocol employed by the intended recipient, arbitration between other converted requests may be employed. The method then concludes (block 1107).

In cases where the received request requires modification, the request may then be modified (block 1104). In some embodiments, one or more modifications, such as, e.g., data compaction, may be made performed. Circuit blocks, such as, e.g., data compactor circuit 700, wrap splitter circuit 800, or any other suitable circuit may be employed. Once the modification has been completed, the modified request may then be converted (block 1105). The method then proceeds as described above.

It is noted that the operations included in the method illustrated in FIG. 11 are depicted as being performed in a sequential fashion. In other embodiments, one or more of the illustrated operations may be performed in parallel.

Figure 12:
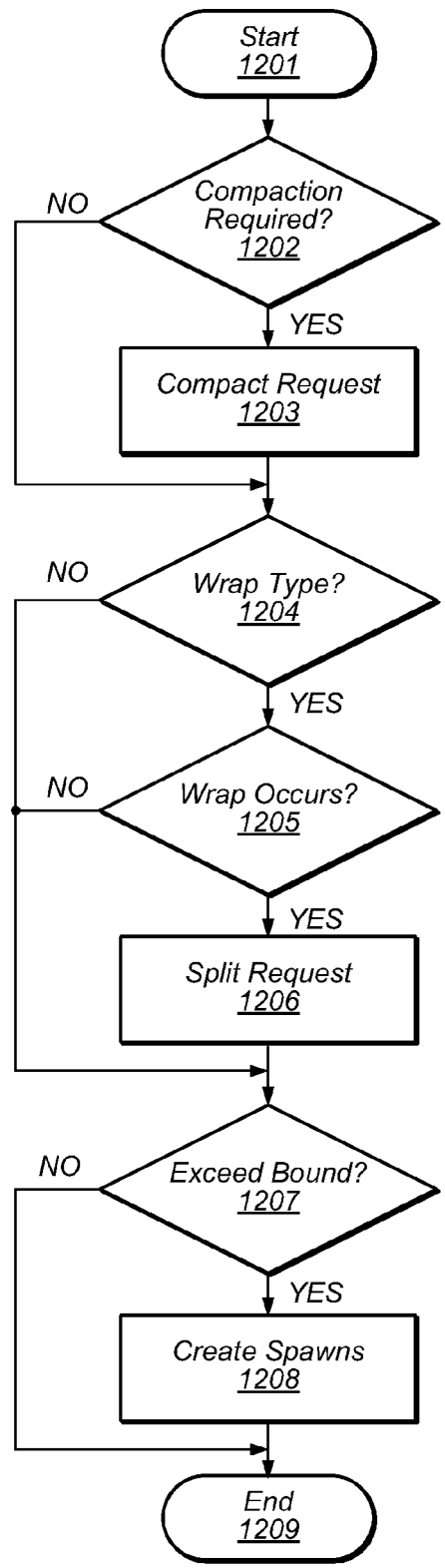
FIG. 12 illustrates a flowchart of an embodiment of a method for modifying requests in a bridge circuit.

A flowchart depicting an embodiment of a method for modifying a request is illustrated in FIG. 12. In some embodiments, the illustrated method may correspond to the operation depicted in block 1104 of the flowchart illustrated in FIG. 11. The method begins in block 1201.

The method is then dependent upon if the request being processing requires data compaction (block 1202). In some embodiments, the determination of the need for compaction may include an examination of one or more data bits included in the request, and may be dependent upon the width of the bus on which the request is being transmitted. The examined data bits may, in other embodiments, correspond to a burst size and a burst length for the request. When compaction is required, the data included in the request is compacted (block 1203). In some embodiments, a data compaction circuit, such as data compaction circuit 700, may be employed to perform the compaction. Data relating to the compaction, such as a burst size and a burst length of the request before compaction may be stored in a storage circuit, such as, reorder buffer 1000, for example.

Once the compaction has completed, or in the case when no compaction is required, the method then depends on if the request being processed is a WRAP type request (block 1204). In some embodiments, one or more data bits of the request may be examined to determine the burst type of the request. When the request is a WRAP type request, the method then depends on if the wrap will actually occur (block 1205). In some embodiments, a burst length may be added to a starting address and the result compared to a maximum address. In cases where the maximum address is exceeded, the request may wrap to a lower address value. If it is determined that a wrap will occur, the request may be split into two separate requests (block 1206). The separate requests (or "spawns") may, in some embodiments, cover a first part of the request, and a second part of the request, which may correspond to the "wrapped" portion.

Once the request has been split, or when the request was determined to not be a WRAP type request, or if the request is a WRAP type request, but the wrap will not occur, the method then depends on if the request exceeds a pre-determined size limit (block 1207). In some embodiments, one or more data bits of the request may be examined to determine if the request exceeds a pre-determined size limit. For example, in a system that supports 8-byte requests, when a 16-byte request is made, the request cannot be processed without modification. When it is determined that the request exceeds a pre-determined size limit, multiple requests are created (block 1208). The multiple requests (or "spawns") may, in some embodiments, each correspond to a portion of the initial request, thereby allowing the initial request to be performed as a series of smaller requests. Once the multiple requests have been created, the method concludes (block 1209). When it is determined that the request does not exceed a pre-determined limit, the method concludes (block 1209).

It is noted that the method illustrated in the flowchart depicted in FIG. 12 is merely an example. In other embodiments, different operations and different orders of operations are possible.

Figure 13:
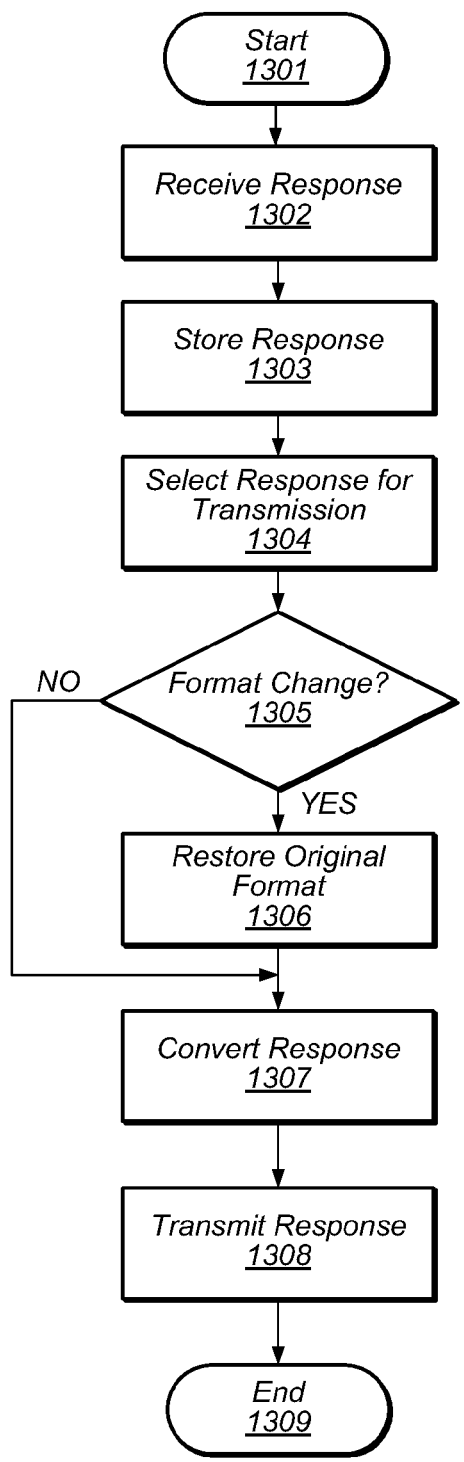
FIG. 13 illustrates a flowchart of an example method of processing a response to a request using a bridge circuit.

A flowchart depicting an embodiment of a method for operating a reorder buffer circuit to receive a response is illustrated in FIG. 13. Referring collectively to reorder buffer 1000 as illustrated in FIG. 10, and the flowchart depicted in FIG. 13, the method begins in block 1301. A response may then be received from agent on a second bus included in an integrated circuit (block 1302). In some embodiments, the response may correspond to a portion of a transaction initiated from an agent on a first bus of the integrated circuit. The transaction may, in some embodiments, include a request for reading data from a memory, storing data in a memory, or any other suitable request from one agent to another.

The received response may then be stored (block 1303). In some embodiments, the response may be stored in response storage circuit 1003 or any other suitable storage circuit, such as, a SRAM, for example. Once all of the data associated with the received response has been stored, the received response may be selected for transmission back to the originating agent (block 1304). In some embodiments, the received response may participate in a round robin arbitration scheme along with other received responses to select which response to send. Arbitration may be required, in some embodiments, when multiple received responses receive their associated data simultaneously.

The method then depends on whether any format changes that were made to original request (block 1305). When no format changes, such as, e.g., data compaction, were made, the selected response may then be converted to the communication protocol employed by the originating agent (block 1307). Once the selected response has been converted to the desired communication protocol, it may then be transmitted to the originating agent (block 1308). The method then concludes in block 1309.

When format changes were made to the original request, then the selected response is processed to return it to the format of the original request (block 1306). In some embodiments, the selected response may be de-compacted. When the original request was split into multiple spawns (as described in more detail above), the selected response may be merged back into a single response to match the format of the original request. Once the selected response has been re-formatted, it may then be converted to the desired communication protocol (block 1307). The method then proceeds as described above.

It is noted that the method depicted in the flowchart illustrated in FIG. 13 is merely an example. In other embodiments, different operations and different orders of operations are possible.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a master unit coupled to a first bus employing a first communication protocol, wherein the master unit is configured to:
receive a request encoded with the first communication protocol from the first bus;
modify the received request; and
convert the modified request to a second communication protocol; and
an interface unit coupled to the master unit and a second bus employing the second communication protocol, wherein the interface unit includes:
a transmission unit configured to transmit transactions on the second bus; and
a receive unit configured to receive and decode transactions from the second bus;
wherein the master unit is further configured to send the converted request to the interface unit; and
wherein to modify the received request, the master unit is further configured to compact the received request dependent upon a determination that a burst size of the received request is less than a width of the first bus.

2. The apparatus of claim 1, wherein the master unit comprises a buffer memory.

3. The apparatus of claim 2, wherein data indicative of the burst size of the received request is stored in the buffer memory.

4. The apparatus of claim 1, wherein to modify the received request, the master unit is further configured to split the request into a first spawn request and a second spawn request dependent upon a determination that the request is a wrap type request.

5. The apparatus of claim 1, wherein to modify the received request, the master unit is further configured to split the request into a plurality of spawn requests dependent upon a determination that a size of the request is larger than a pre-determined size.

6. A method, comprising:
receiving a request from a functional block on an integrated circuit over a first bus, wherein the first bus employs a first communication protocol;
storing parameters associated with the received request;
modifying the received request;
converting the modified request to a second communication protocol; and
transmitting the converted request to a second functional block on the integrated circuit over second bus, wherein the second bus employs the second communication protocol;
wherein modifying the received request comprises compacting the request dependent upon a determination that a burst size of the received request is less than a width of the first bus.

7. The method of claim 6, wherein modifying the received request comprises splitting the received request into a first spawn request and a second spawn request responsive to a determination that the received request is a wrap type request.

8. The method of claim 6, wherein modifying the received request comprises generating a plurality of spawn requests responsive to a determination that the size of the received request is larger than a pre-determined size.

9. The method of claim 6, further comprising:
receiving a response to the transmitted converted request from the second functional block over the second bus;
storing the received response;
selecting the received response for transmission; and
re-formatting the received response dependent upon a determination that the transmitted converted request had been modified.

10. The method of claim 9, wherein re-formatting the received response is dependent upon the stored parameters.

11. The method of claim 8, wherein generating a plurality of spawn requests comprises storing data indicative of the number of generated spawn requests.

12. A system, comprising:
- a first functional block coupled to a first bus of an integrated circuit, wherein the first functional block is configured to send transactions encoded with a first communication protocol;
- a second functional block coupled to a second bus of the integrated circuit, wherein the second functional block is configured to receive transactions encoded with a second communication protocol; and
- a bridge circuit coupled to the first bus of the integrated circuit and the second bus of the integrated circuit, wherein the bridge circuit is configured to:
    - receive a request encoded with the first communication protocol from the first functional block over the first bus;
    - store parameters associated with the received request;
    - modify the received request;
    - convert the modified request to the second communication protocol; and
    - transmit the converted request over the second bus to the second functional block;
- wherein to modify the request, the bridge circuit is further configured to compact the request dependent upon a determination that a burst size of the received request is less than a width of the first bus.

13. The system of claim 12, wherein to modify the received request, the bridge circuit is further configured to split the request dependent upon a determination that the received request is a wrap type request.

14. The system of claim 12, wherein to modify the received request, the bridge circuit is further configured to split the request into a plurality of spawn requests dependent upon a determination that a size of the received request is larger than a pre-determined size.

15. The system of claim 14, wherein to split the request into a plurality of spawn requests, the bridge circuit is further configured to store data indicative of the number of spawn requests.

16. The system of claim 12, wherein the bridge circuit is further configured to:
- receive a response to the transmitted converted request from the second functional block over the second bus;
- store the received response;
- select the received response for transmission; and
- re-format the received response dependent upon a determination that the transmitted converted request had been modified.

17. The system of claim 16, wherein to re-format the received response the bridge circuit is further dependent upon the stored parameters.

* * * * *